United States Patent [19]
Matson

[11] 4,276,180
[45] Jun. 30, 1981

[54] INDUSTRIAL WASTE-WATER REUSE BY SELECTIVE SILICA REMOVAL OVER ACTIVATED ALUMINA

[76] Inventor: Jack V. Matson, 10919 Braes Forest, Houston, Tex. 77071

[21] Appl. No.: 98,911

[22] Filed: Nov. 30, 1979

[51] Int. Cl.³ .............................. C02F 1/60; C02F 5/08
[52] U.S. Cl. .................................. 210/683; 210/696; 210/699; 210/765
[58] Field of Search ................. 210/24, 37 R, 42 R, 210/46, 57–59, 660, 683, 696, 698, 699, 702, 714, 749; 252/175, 181

[56] References Cited

U.S. PATENT DOCUMENTS

| | | | |
|---|---|---|---|
| 1,582,300 | 4/1926 | Otis | 210/42 R |
| 1,860,781 | 5/1932 | Liebhnecht | 210/30 R |
| 2,886,460 | 5/1959 | Alexander | 106/308 R |
| 3,450,265 | 6/1969 | Kreusch et al. | 210/140 |
| 3,890,228 | 6/1975 | Hwa et al. | 210/58 |

FOREIGN PATENT DOCUMENTS

| | | |
|---|---|---|
| 925700 | 3/1955 | Fed. Rep. of Germany . |
| 1285956 | 8/1969 | Fed. Rep. of Germany . |
| 1301757 | 8/1969 | Fed. Rep. of Germany . |
| 53-22556 | 7/1978 | Japan .......... 210/57 |
| 351021 | 6/1931 | United Kingdom . |

OTHER PUBLICATIONS

Clifford et al., "Activated Alumina: Rediscovered 'Adsorbent' for Fluoride, Humic Acids, and Silica," *Ind. Water Eng.*, Dec. 1978.
Behrman et al., "Removal of Silica from Water," *Ind. & Eng. Chem.*, Apr. 1940, pp. 468–472.

*Primary Examiner*—Peter A. Hruskoci
*Attorney, Agent, or Firm*—Pravel, Gambrell, Hewitt, Kirk, Kimball & Dodge

[57] ABSTRACT

Industrial waste-water, particularly cooling water containing water conditioning chemical additives, which heretofore has been discharged to the environment as blowdown because of high silica content, may now be treated for selective silica removal to condition it for reuse in industrial systems. It has been discovered that silica may be effectively and selectively removed from such waste-water streams without the consequential removal of its beneficial chemical conditioning additives by passing such water over activated alumina and thereafter returning it to the system from which it was withdrawn thereby maintaining the silica concentration in the system below its scale formation level.

10 Claims, 2 Drawing Figures

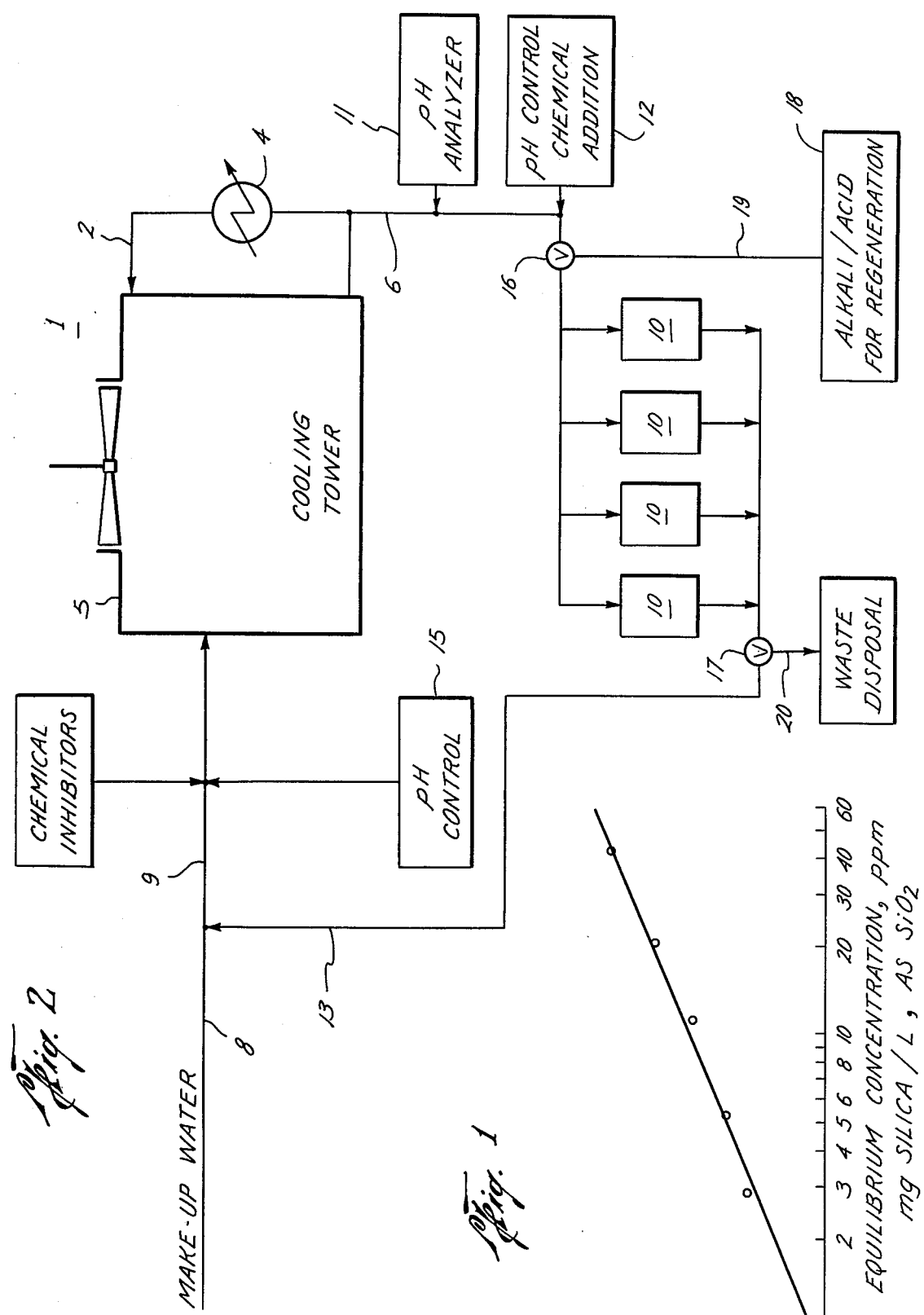

INDUSTRIAL WASTE-WATER REUSE BY SELECTIVE SILICA REMOVAL OVER ACTIVATED ALUMINA

BACKGROUND OF THE INVENTION

The largest source of industrial waste-water which is discharged to the environment is blowdown from cooling systems. Over 30 billion gallons per day are discharged in the United States from industrial facilities, and this figure does not include utilities which are the largest users of cooling water. Blowdown can contain heat, toxic chemicals—in the form of water conditioning agents, such as, corrosion and scale inhibitors, and disperants—and also have a high degree of dissolved solids. Thus, blowdown which is discharged to the environment constitutes a major source of pollution.

By reason of the high concentration of dissolved solids in raw cooling water, including hardness such as calcium and magnesium compounds, which makes it scaling and corrosive to metallic parts of cooling systems such as heat exchangers, it is customary to add corrosion inhibitors such as soluble alkali metal chromates to the cooling water as well as softening agents and scale inhibitors such as phosphonates, polymaleic anhydrides or polyacrylates. Dissolved silica is a major scale forming material found in cooling water. It is the most ubiquitous material in cooling water and no known inhibitor, chelant or dispersant exists which will significantly control its tendency to form scale when its concentration in a cooling water system exceeds its solubility limit of roughly about 150 to about 200 milligrams per liter. Above such limits it polymerizes to form scale on heat exchange surfaces. It may also react with multivalent cations, such as magnesium and calcium, to form scale.

Heretofore, the only practical method employed to control the silica concentration in cooling water systems has been to discharge a blowdown stream from such systems to the environment when, due to water evaporation from the system, the silica concentration begins to approach its limits of solubility. Thereafter, fresh water makeup of low silica concentration is added to the system to compensate for the water deficiency created by the blowdown and evaporation from the system, and the total silica concentration of the system is reduced to a safe level.

The blowdown method of silica control is undesirable in at least two important respects. First, the fresh water makeup to replace the blowdown water losses must be treated with chemical additives for water softening, and corrosion and scale inhibition to condition it for use in a cooling water system—at a cost which, on an industry wide level, has been estimated at about five billion dollars a year. The value of such treating chemicals which are lost from the system in blowdown have been estimated at a billion dollars per year. This represents an expense which could be avoided if blowdown could be conditioned for reuse without removal of such chemical additives. Secondly, and more importantly, the blowdown must eventually be released to the environment and by reason of the chemical conditioning agents it contains thus constitutes it as major source of pollution. In many instances where local regulations exist on chromate discharges to natural streams and sewer systems and the like, it is necessary to treat the chromate containing blowdown by costly ion exchange or chromate distruction processes to reduce its chromate content to acceptable levels prior to discharge. Even then, the non-chromate chemical additives and highly dissolved solids such as alkali metal chlorides, carbonates and sulfates are discharged to the environment as pollutants. Aside from the natural desire which has always existed to eliminate pollution sources such as blowdown there is also an increasing concern evidenced by recent environmental legislation to strictly regulate discharges from cooling water systems with the ultimate goal to totally eliminate the discharge of pollutants contained therein.

Previous efforts to remove silica from the blowdown streams of cooling water systems such as by softening, reverse osmosis, demineralization and/or evaporation processes are non-selective in that not only silica but the other beneficial water conditioning chemicals are eliminated from the treated water as well. Ion exchange methods have also been attempted for silica removal, but have proved generally unacceptable because the high sulfate content of cooling water excludes absorption of silica by conventional ion-exchange resins. Ion exchange resins can only be employed for silica removal from cooling water if such water is first demineralized to remove the interfering sulfates. The above mentioned methods have not proved entirely satisfactory and hence have been used only to a limited extent.

Most attention to silica removal from water to prevent scaling has been directed to the treatment of raw water—to prepare it as boiler feed water for steam power production—wherein such raw water has not been previously conditioned by the addition of chemical additives such as chromates, phosphonates and/or sulfates. In such case wherein the removal of silica is the only concern the prior art evidences that a number of researchers in the late 30's and 40's tested a variety of compounds for removal of soluble silica. The compounds tested include ferric sulfate, magnesium sulfate, magnesium oxide, aluminum hydroxide, sodium aluminate and activated alumina.

Thus, although a number of methods exist for silica removal generally such methods are not suitable for application to the treatment of chemically conditioned water such as is normally found in typical cooling water systems.

Activated alumina is known to have silica removing properties. Behrman and Gustafson "Removal of Silica from Water", *Industrial Engineering Chemistry*, 1940, pp. 468–72, describe a series of experiments on silica removal from raw water utilizing granular activated alumina and found reduction of silica in water from 50 milligrams per liter to 5 milligrams per liter. Additionally, they found that activated alumina could be regenerated for reuse by washing it with a solution of strong acid followed by a solution of strong alkali.

Although activated alumina has long been known as an absorbent for silica in the treatment of raw water such as boiler feed water and the like, to my knowledge heretofore there has been no attempt to apply it to the removal of silica from a water stream containing sulfates and the various dispersants, corrosion and scale inhibitors, and water softeners normally found in typical cooling water systems—particularly chromates and phosphonates.

Activated alumina is known as an absorbent for organic and inorganic compounds in their nonionic, cationic and anionic forms. Activated alumina has sites available for both cation and anion absorption and both cation and anion exchange can occur simultaneously on the alumina surface, although one or the other usually predominates. Activated alumina's characteristic as being an ion absorbent would make it appear to be unsuitable for use in the treatment of cooling water blowdown for silica removal since one would expect the alumina to remove beneficial water treatment additives contained therein and/or that such additives would so saturate the active absorption sites on the alumina surface so as to render it incapable of removing silica.

BRIEF SUMMARY OF THE INVENTION

The method of the invention comprises continuously diverting a side stream of chemically conditioned water from a recirculating cooling water system, treating said stream at a pH of from about 7.0 to 9.0, preferably from 8.0 to 9.0, by contacting it with activated alumina in its acid treated form for the selective removal of silica, and continuously returning said chemically conditioned treated side stream to the recirculating cooling water system, whereby, upon the recombination of the low silica content treated side stream with the high silica content water in said system, the silica concentration of said system is maintained below a predetermined level wherein silica scale will not form. Additionally, the method further includes the step of regenerating the activated alumina adsorbent upon its becoming saturated with silica to recondition it for additional silica removal by first treating it with a dilute base followed thereafter by treatment with a dilute acid.

BRIEF DESCRIPTION OF THE DRAWINGS

FIG. 1 is an adsorption isotherm for the adsorption of monomeric silica on activated alumina at 30° C., plotted as a Freundlich equation.

FIG. 2 schematically depicts an embodiment of the process in accordance with the invention.

DETAILED DESCRIPTION OF THE INVENTION

Activated alumina is the common name for γ aluminum oxide ($\gamma$-$Al_2O_3$). It is available in gram quantities as an analytical reagent and in ton quantities as a commercial adsorbent for drying gases, solvents and fuels. The basic method of preparing activated alumina is low temperature dehydration of hydrous aluminum oxides at 300°–700° C. Activated alumina differs from high temperature alumina in that it readily takes up water and dissolves in strong acids. Both forms are soluble in strong alkalis.

Activated alumina in its natural form (untreated) is a basic adsorbent but it is usually used in water treatment in its acid-treated form. As described hereafter, when employed for the selective removal of silica from cooling system water, it is preferred to use the activated alumina in its granular form. An acid treated activated alumina having a BET surface area of 95 to 300 m²/gm, and preferably from 80 to 120 m²/gm, is employed.

Typically, the cooling water which may be treated by this method to reduce its silica content contains large quantities of sulfate ions, chromate ions, phosphonates and/or other scale inhibitors such as polymaleic anhydrides or polyacrylates as well as dissolved calcium, magnesium and other total dissolved solids. It has been found that the presence of various concentrations of sulfates and/or phosphonates does not adversely affect the adsorption of silica from such water by activated alumina. Also, it has been found that although the chromate content of such water is first adsorbed by the alumina, it is subsequently displaced therefrom by silica adsorption and the chromate is returned to the water solution. Such properties of activated alumina make it suitable for use in a method to control the silica concentration of cooling water systems by conditioning the blowdown therefrom for reuse in the cooling water system by selectively adsorbing the silica content thereof on the activated alumina without consequential interference by the sulfates or the removal of the beneficial phosphonates and chromates contained therein.

To obtain such selective silica removal with activated alumina it is necessary to maintain the pH of the water to be treated between a pH value of about 7.00 to about 9.00, and preferably from about 8.0 to about 9.0. Silica removal efficiencies are markedly decreased at pH levels below about 8.0. At pH values above about 9.0 the hydroxide ion concentration in the water competes for the active sites on the alumina and excludes adsorption of silica thereon. Most preferably the water to be treated with activated alumina is maintained at a pH from about 8.0 to about 8.5.

The data tables which follow establish that activated alumina may be employed in a side stream treatment to selectively remove silica from cooling water under the operating conditions of pH, temperature and water conditioning additives normally prevailent in typical recirculating cooling water systems.

Table I illustrates the effect of solution pH upon the silica removal efficiency of activated alumina. The effect of varying pH upon silica removal was determined by adding, under continuous agitation, activated alumina to aqueous silica solutions containing 100 mg silica per liter. The pH of the aqueous silica solution was adjusted to the various values indicated in Table I by the addition of sodium hydroxide or hydrochloric acid. Each solution was then monitored for soluble silica content occurred with the passage of time. In all cases no further significant silica removal occurred after thirty minutes. As the data of Table I indicates optimum silica removal over activated alumina occurs when the solution pH is about 8.5.

TABLE I

EFFECT OF pH ON SILICA REMOVAL WITH ACTIVATED ALUMINA

| pH of Solution | mg Silica Remaining in 1 Liter of Solution |
| --- | --- |
| 5.5 | 31.6 |
| 6.5 | 27.7 |
| 7.5 | 13.7 |
| 8.5 | 5.9 |

10g activated alumina/liter
Original silica concentration - 100 mg/liter
Temperature - 30° C.
Retention time - 30 minutes Preliminarily to establishing absorption isotherms for silica removal over activated alumina the effects of varying the amount of activated alumina per liter of solution to be treated and the retention time or incubation period necessary for efficient silica removal was determined. The effect of varying the activated alumina concentration is illustrated in Table II, which shows virtually 100% silica removal may be accomplished at a value of about 10 g or greater of activated alumina/liter of solution.

TABLE II
EFFECT OF INCREASING CONCENTRATIONS OF ACTIVATED ALUMINA

| | g of Activated Alumina in 1 liter of Solution | mg Silica Remaining in 1 liter of Solution |
|---|---|---|
| A. | 5 | 15.4 |
| | 10 | 3.3 |
| | 20 | 1.5 |
| | 30 | <1 |
| B. | 2 | 39.1 |
| | 4 | 21.3 |
| | 6 | 12.2 |
| | 8 | 6.5 |

Original silica concentration - 100 mg/liter
Temperature - 30° C.
pH of solution - 8.5, adjusted by addition of NaOH
Retention Time -

Table III illustrates the effect of retention time—that period of time during which the aqueous silica solution is in contact with activated alumina—upon silica removal over activated alumina. The table indicates that the bulk of the silica removal occurs upon its initial contact with the activated alumina, that is, within the first 10 minutes of contact, and that no further significant removal occurs after 30 minutes.

TABLE III
EFFECT OF RETENTION TIME ON THE REMOVAL OF SILICA BY ACTIVATED ALUMINA

| Time | mg Silica Remaining in 1 liter of Solution |
|---|---|
| 5 minutes | 45.4 |
| 10 minutes | 22.9 |
| 20 minutes | 20.8 |
| 30 minutes | 18.6 |

2g activated alumina/liter
Original silica concentration - 100 mg/liter
Temperature - 30° C.
pH of solution - 8.5

A number of adsorption isotherms—which relates the concentration of free silica to that of silica bound to the activated alumina—and column tests have been run on activated alumina to determine its silica loading capacity. As illustrated in Table IV, isotherms were determined at 30° C. and 50° C. The data of Table IVA, the 30° C. isotherm, is plotted in the form of a Freundlich equation as FIG. 1. Analysis of the isotherm data demonstrates that there is no significant difference in silica removal by activated alumina over the temperature range of from about 30° C. to about 50° C. Activated alumina is effective to selectively remove silica from cooling water over the typical temperature range for such water, namely from about 0° C. to about 50° C.

TABLE IV
EFFECT OF SILICA REMOVAL BY ACTIVATED ALUMINA

| Sample | Grams of Alumina in 1 liter | mg Silica Remaining in 1 liter of Solution | |
|---|---|---|---|
| | | I | II |
| A. EFFECT AT 30° C. | | | |
| 1 | 2 | 39.1 | 47 |
| 2 | 4 | 21.3 | 19.9 |
| 3 | 6 | 12.2 | 10.4 |
| 4 | 8 | 6.5 | 4.1 |
| 5 | 10 | 3.3 | 2.6 |
| B. EFFECT AT 50° C. | | | |
| 1 | 2 | 41 | 41.1 |
| 2 | 4 | 11.5 | 14.4 |
| 3 | 6 | 8.1 | 6.1 |
| 4 | 8 | 4.9 | 4.9 |
| 5 | 10 | 1.6 | 2.4 |

I, II represent duplicate experiments
Original silica concentration - 100 mg/liter
pH of solution - 8.5
Retention time - 30 minutes A typical adsorption isotherm for the adsorption of monomeric silica on activated alumina at 30° C. is illustrated in FIG. 1. The Freundlich equation shown in FIG. 1 indicates that activated alumina has good capacity for silica.

Cooling water, in addition to silica, normally contains fairly high concentrations of sulfates and phosphonates. Sulfates are present from the use of sulfuric acid for cooling water alkalinity control. Phosphonates, such as Dequest 2010 (Monsanto, hydroxyethylidenediphosphonic acid), are normally added as scale preventatives and/or for corrosion control. Table V illustrates that such water conditioning additives do not adversely affect silica removal over activated alumina. A value of 0.1 M $Na_2SO_4$ was selected to over estimate the sulfate value ever attained in a recirculating cooling water system.

TABLE V
EFFECT OF $Na_2SO_4$ OR DEQUEST 2010 ON THE REMOVAL OF SILICA BY ACTIVATED ALUMINA

| g of Activated Alumina in 1 liter of Solution | $Na_2SO_4$ | | DEQUEST 2010 | |
|---|---|---|---|---|
| | 30° C. | 50° C. | 10 ppm | 100 ppm |
| 2 | 44.1 | 45 | 54.9 | 45.4 |
| 4 | 16.3 | 12.5 | 28.4 | 25 |
| 6 | 7.6 | 6.3 | 6.1 | 12.3 |
| 8 | 4.6 | 5.5 | 2.9 | 5.0 |
| 10 | 1.2 | 4 | 2.4 | 3.3 | g activated alumina as indicated
Original silica concentration - 100 mg/liter
Temperature - 30° C. or as indicated
pH of Solution - 8.5
Additive Concentration - 0.1M $Na_2SO_4$ at 30 or 50° C.,
DEQUEST 2010 10 ppm or 100 ppm as indicated at 30° C.

The data of Table V for the sulfate containing sample run at 30° C. when compared to that of the 30° C. run of Table IV demonstrates that the presence of sulfates does not appreciably affect silica removal over activated alumina. Likewise, a comparison of the phosphonate runs of Table V with the runs of Table IV shows that phosphonates exert no adverse affects on silica removal.

Referring now to FIG. 2, the invention is illustrated as employed in a cooling system 1 including a cooling loop 2 wherein the cooling loop includes a plurality of heat exchangers (represented as a single heat exchanger 4) through which suitably conditioned water is recirculated continuously to provide cooling, usually to cool a process fluid. The treated cooling water contains chromate ions derived from a chromate-type corrosion inhibitor, sulfate ions, phosphonates as scale inhibitors and silica. The coolant-return line from the heat exchanger 2 includes one or more cooling towers 5 of any suitable design for transferring heat from the water coolant to the atmosphere by evaporation. In the course of water evaporation the silica content of the cooling water increases in concentration towards its scale formation level of about 150-200 mg/liter. As indicated, a relatively small fraction of the cooling water is withdrawn prior to the cooling loop as a side stream 6 and diverted to pass through one or more columns, arranged in parallel, filled with activated alumina granules 10. The pH value of the water diverted in the side stream is continually analyzed by any suitable pH analyzer 11 prior to its contact with the activated alumina contained in columns 10. Provisions are incorporated whereby acid or alkali may be added for pH control 12 to the side stream to adjust its pH value, if necessary, to maintain it between values of about 8.0 to about 9.0, and preferrably 8.0 to about 8.5, prior to its contact with the activated alumina of the columns 10. The silica content of the side stream is selectively reduced upon its contact with the activated alumina while the chemical conditioning additives contained in the water pass through the columns undisturbed. Thereafter, the side stream is returned through line 13 to the cooling water system. As illustrated, the treated side stream of low silica content is combined with an amount of makeup water 8 necessary to replace the evaporative losses from the system to form a combined makeup stream 9. The combined side stream and makeup water in line 9 is treated with chemical inhibitors 14 to the extent necessary to properly condition the makeup water portion 8 of the makeup stream 9 and its pH is adjusted at point 15 to make it compatable with the water in the cooling water system to which it is to be added. Alternatively, the required chemical inhibitors and the acid or alkali for pH control could be added directly to the water contained in the cooling tower 5. In this manner, since silica is constantly being removed from the cooling system water by the side stream treatment over activated alumina, the silica content of the system may be maintained below a predetermined level whereby silica scale will not form in the cooling water system.

The side stream 6 diverted from the cooling loop 2 is somewhat analogous to the usual blowdown in the sense that sufficient water is diverted to maintain the silica concentration in the loop below a preselected level. In another sense, the side stream 6 is not analogous to the usual blowdown, in the sense that the side stream is not discharged from the system with the consequential losses of valuable water conditioning chemicals and pollution to the environment but is preserved through the use of this invention.

The following example illustrates the application of an activated alumina silica control system to a typical industrial facility. For a cooling water system having a makeup water silica concentration of 6 mg/l, a maximum allowable silica level in the cooling water of 160 mg/l, a drift loss (e.g., the loss of water from the system which occurs other than by evaporation—such as water lost as mist or from system leaks) rate of 2.4% of the makeup water rate, and a makeup water rate of 5,700 gal/min., the side stream flow rate, $Q_s$, is determined as follows:

$$Q_s = \frac{Q_m C_m - Q_d C_w}{C_w - C_a}$$

wherein $Q_m$ is the makeup water flow rate, $Q_d$ is the drift loss rate, $C_m$ is the makeup water silica concentration, $C_w$ is the cooling water silica concentration and $C_a$ is the silica concentration of the side stream water after treatment with activated alumina. Some value for $C_a$ must be chosen which represents the maximum allowable breakthrough concentration of silica in the side stream after contact with the activated alumina columns, after which time the activated alumina must be regenerated. In a typical case, this value may be set at a maximum of 40 mg/l. From the above, it can be seen that to maintain the silica concentration in the cooling water system of the example below 160 mg/l, the design flow rate through the activated alumina column will be about 390 liters per minute.

The approximate size of the activated alumina column may be determined as follows. Based on the adsorption isotherm of FIG. 1, it may be seen that the maximum silica loading of the activated alumina, for the maximum breakthrough concentration allowable of 40 mg/l of silica, is 6 grams of silica (as $SiO_2$) per 100 grams of alumina. The amount of silica that must be removed by the activated alumina column per day is represented by the difference in the silica concentration of the makeup water less the amount of silica lost from the system in the water drift. Thus, in this typical example, the amount of silica that must be removed per day is 174 kg which, at a silica loading of 6 mg/100 mg alumina, requires the use of 2,903 kg of activated alumina. Typically, activated alumina having a BET surface area of between 80 to 120 square meters per gram will have a density of 2,563 kg/m³. Thus, 1.13 m³ of activated alumina would be required to remove 174 kg of silica per day. For a typical side stream water velocity of 101 liters per minute per square meter, the column area necessary for the design flow rate of 390 liters per minute as the side stream would be about 3.81 m².

The retention time of the side stream over the activated alumina in columns 10 is a function of the side stream flow rate and the column geometry. The column geometry required to achieve a given retention time for any particular side stream flow rate is within the ordinary engineering skill of those in the art to determine and need not be specifically discussed. It is preferred to employ a column design which achieves a retention time of from at least about 3 minutes, and most preferrably of 10 minutes or greater. Although retention time greater than 30 minutes may be employed, if desired, this is generally not required since the bulk of the soluble silica is removed from the side stream during its initial 10 minute contact period with activated alumina.

The above example is given as illustrative of the application of the invention to a typical cooling water system and is not intended as a limitation thereon. From the above those of ordinary skill in the art may readily determine that amount of activated alumina which is sufficient to continuously maintain the silica content of the cooling water of any given cooling water system below a predetermined level.

The design equation:

$$Q_s = \frac{Q_m C_m - Q_d C_w}{C_w - C_a}$$

allows for the rough sizing of any system wherein the makeup water flow rate ($Q_m$), makeup water silica concentration ($C_m$), drift loss rate ($Q_d$), maximum allowable cooling water silica concentration ($C_w$) and maximum silica breakthrough concentration ($C_a$) are known.

For the above example, the selection of $C_a$ as 40 mg/l from the equilibrium data was a conservative selection. It has been found that the column will pick up much higher levels of silica in the front end of the column since, in addition to being adsorbed, silica may also polymerize on the alumina surface and thus be removed from the side stream water to a much greater extent than equilibrium data alone would indicate.

Although in the column tests which have been run, it has been difficult to achieve breakthrough of silica concentrations past a predetermined breakthrough level; nevertheless, it is envisioned that after a period of continuous operation the alumina column will become so saturated with removed silica as to require regeneration. The alumina column may be readily regenerated in a two-step process. To regenerate the silica containing adsorbant, it is first flushed with a dilute solution of base, such as sodium hydroxide or potassium hydroxide, which may range in concentration from 0.05 to about 0.1 molar concentration. Flushing the activated alumina with an excess of dilute base displaces the silica adsorbed thereon and returns it to the basic solution as a salt of silicic acid. After the activated alumina has been flushed with the dilute base it is subsequently reactivated for silica adsorbtion by flushing with an excess of dilute acids, such as HCl or sulfuric acid. When HCl is used as the acid wash its concentration may range from 0.05 to about 0.1 molar.

With reference to FIG. 2, valves 16 and 17 are incorporated into side stream 6 and return line 13, respectively. When valves 16 and 17 are in their open position side stream flow from the cooling system 1 is established through the activated alumina columns 10. When valves 16 and 17 are closed side flow from the system 1 through the columns 10 is discontinued, the columns are disconnected from system 1 and are placed in flow communication with the acid/alkali regeneration solution represented as being contained in the regeneration fluid reservoir 18. Regeneration fluid passes through line 19 and the activated alumina in columns 10 and thereafter passes through line 20 to a waste disposal reservoir 21. In the first regeneration step an excess of dilute alkali is contacted with the activate alumina to remove its absorbed silica content. In the second step of regeneration a dilute acid is contacted with the activated alumina to convert it to its acid form and ready if for further silica removal. Upon completion of regeneration valves 16 and 17 are opened thus disconnecting the columns 10 from the regeneration system and placing them back in side stream flow communication with system 1.

Of course, when more than one column of activated alumina is employed in the system then any appropriate valving arrangement may be employed (not illustrated) wherein each column is singularly isolated from flow communication with system 1 and regenerated while the others are kept on stream with system 1 for silica removal. After one column is regenerated it would be placed back on stream with system 1 and another column would be isolated and regenerated. In this manner the side stream treatment for silica removal would proceed without interruption for the purpose of regenerating the activated alumina. The valving arrangement required to provide for the singular regeneration of any given column, whether arranged in series or parallel, while other columns remain on stream with the system is within the ordinary skill of those in the art and does not require illustration or further discussion.

Employment of this invention will permit industry to substantially reduce or eliminate a major source of pollution to the environment by conditioning a wastewater stream for reuse in a system from which heretofore it has been discharged as a pollutant by selectively reducing such stream's silica content without disturbing its contained water conditioning chemical additives. Although the above invention has been described and illustrated in terms of its preferred embodiments, those of ordinary skill in the art may make modifications and changes therein without departing from the spirit and scope of the invention as described above or claimed hereafter.

I claim:

1. A method for maintaining silica content in a recirculating cooling water system containing water conditioning chemicals selected from the group consisting of sulfates, phosphonates and chromates below a level at which silica scale formation occurs without discharging blowdown from the system with consequential elimination from the system of said water conditioning chemicals or resulting pollution of the environment, comprising the steps of:
    (a) continuously diverting a portion of the chemically conditioned cooling water from said cooling water system as a side stream;
    (b) contacting said side stream with activated alumina while said side stream has a pH value of from about 7.0 to about 9.0 to selectively remove silica from said water while leaving the chemical conditioning of the water undisturbed; and
    (c) then returning said chemically conditioned side stream of reduced silica content to the cooling water system.

2. The method of claim 1, wherein the pH of said water is from about 8.0 to about 8.5.

3. The method of claim 2, wherein the chemically conditioned water contains sulfates.

4. The method of claim 2, wherein at least some of the water conditioning chemicals are phosphonates.

5. The method of claim 2, wherein at least some of the water conditioning chemicals are chromates.

6. The method of claim 2, wherein the silica content of the recirculating cooling water system is maintained below about 160 mg/1 by passing the diverted water stream over said activated alumina.

7. The method of claim 2, wherein the side stream has a temperature of from about 0° C. to about 50° C. as it contacts the activated alumina.

8. The method of claim 2, wherein the side stream has a temperature of from about 30° C. to about 50° C. as it contacts the activated alumina.

9. The process of claim 8 wherein the side stream is contacted with the activated alumina at a residence time of between about 3 to about 10 minutes.

10. A method for maintaining silica concentration in a recirculating cooling water system containing water conditioning chemicals selected from the group consisting of sulfates, phosphonates and chromates below a level at which silica scale formation occurs without discharging blowdown from the system with consequential elimination from the system of said water conditioning chemicals or resulting pollution of the environment, comprising the steps of:
    (a) continuously diverting a portion of the chemically conditioned cooling water from said cooling water system as a side stream;

(b) contacting said side stream with activated alumina at a residence time of from about 5 minutes to about 30 minutes while said side stream has a pH value of from about 8.0 to about 9.0 and a temperature of from about 30° C. to about 50° C. to selectively remove silica from said side stream without otherwise significantly disturbing the chemical conditioning of said side stream; and (c) then returning said chemically conditioned side stream of reduced silica content to the cooling water system.

* * * * *